United States Patent [19]
Fogelber

[11] 3,949,848
[45] Apr. 13, 1976

[54] GEAR CHANGING MECHANISM
[75] Inventor: Mark J. Fogelber, Muncie, Ind.
[73] Assignee: Borg-Warner Corporation, Chicago, Ill.
[22] Filed: Nov. 1, 1974
[21] Appl. No.: 520,194

[52] U.S. Cl. ............... 192/38; 192/44; 192/48.91; 192/48.92
[51] Int. Cl.² .................... F16D 41/08; F16D 47/00
[58] Field of Search .......... 192/38, 44, 48.91, 48.92

[56] References Cited
UNITED STATES PATENTS

| | | | |
|---|---|---|---|
| 2,051,386 | 8/1936 | Murray | 192/44 X |
| 2,061,288 | 11/1936 | Murray | 192/48.92 |
| 3,426,874 | 2/1969 | Johnston, Jr. | 192/48.92 X |

Primary Examiner—Allan D. Herrmann
Attorney, Agent, or Firm—Julian Schachner

[57] ABSTRACT

A pair of bi-directional roller clutches are connected through outer races to separate gearsets and share a common inner race connected to a driven shaft. A shifting sleeve is slidably mounted on the common inner race and is selectively engagable with the retainers of the roller clutches, thereby locking the rollers of the engaged clutch in the freewheeling mode and releasing the rollers of the other clutch, allowing that clutch to drive through its associated gearset.

10 Claims, 12 Drawing Figures

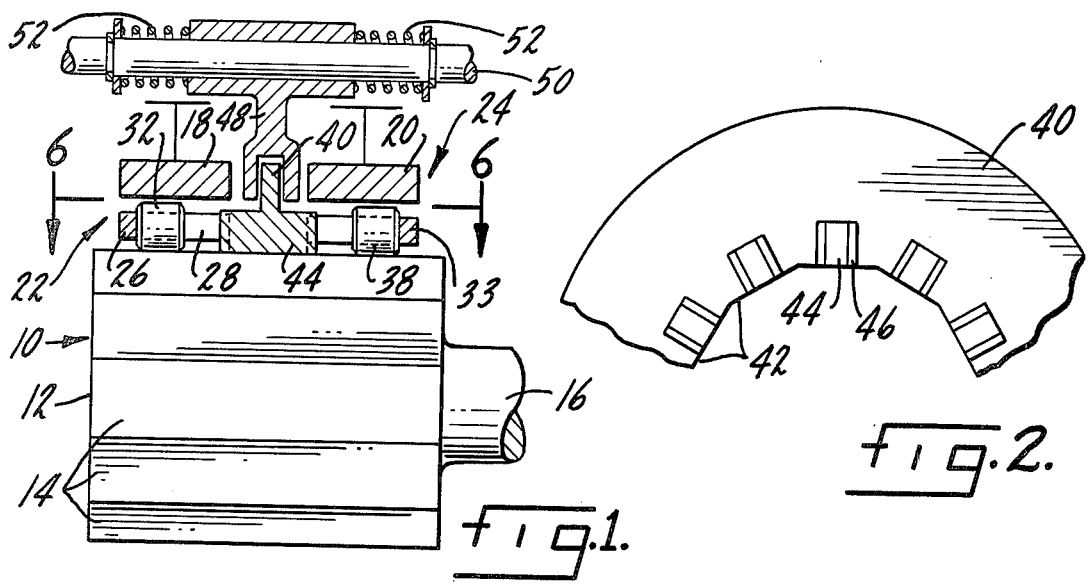
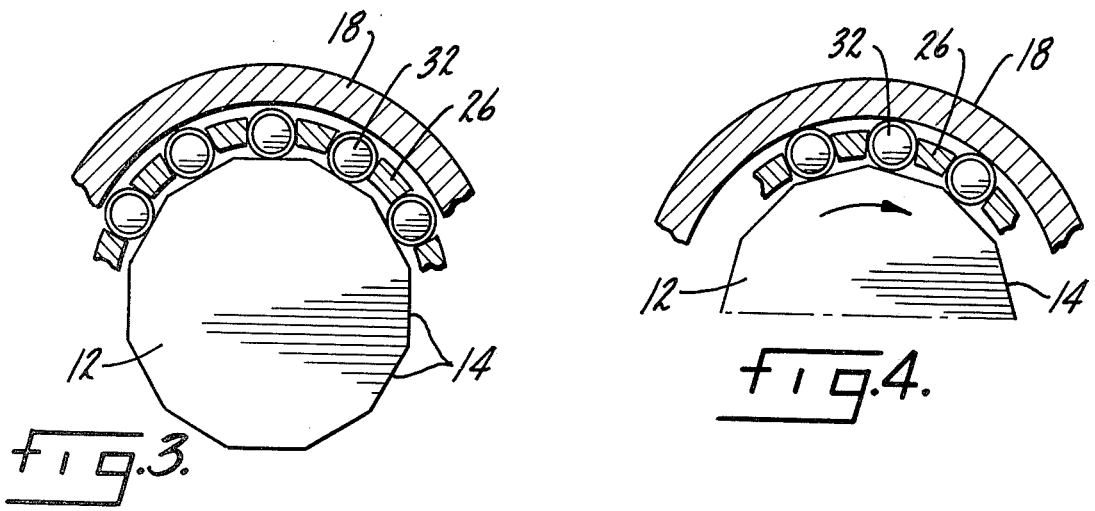
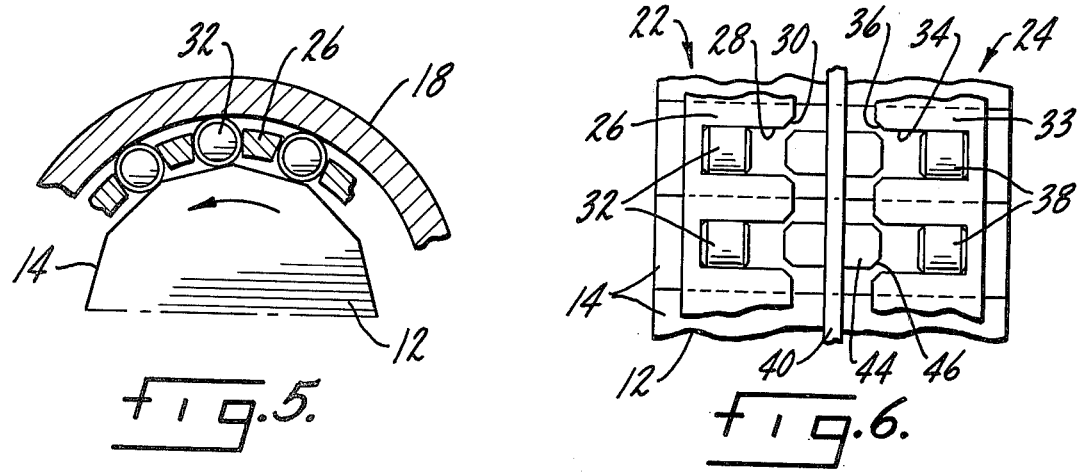

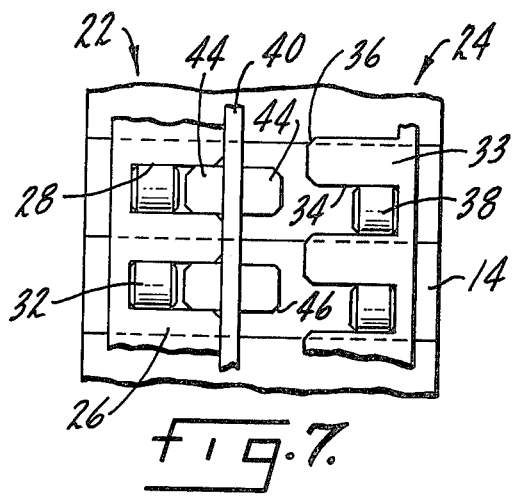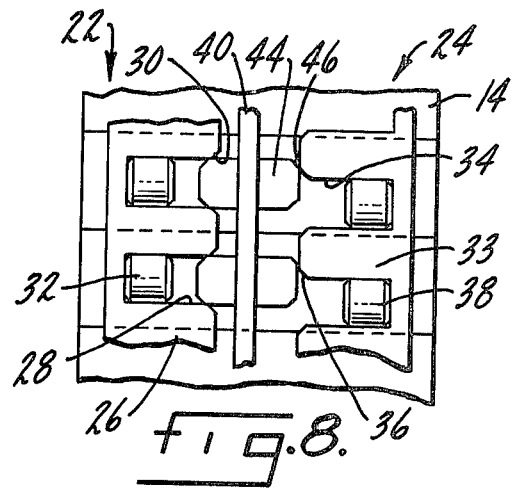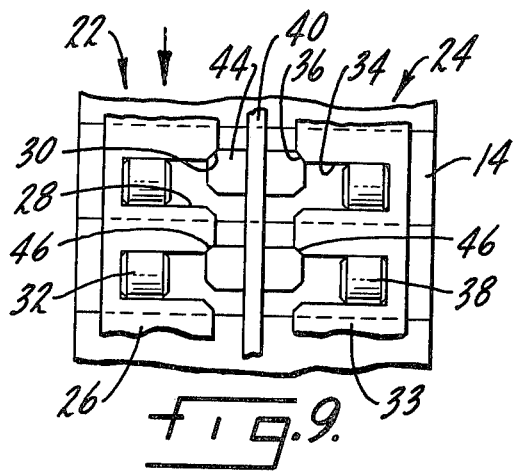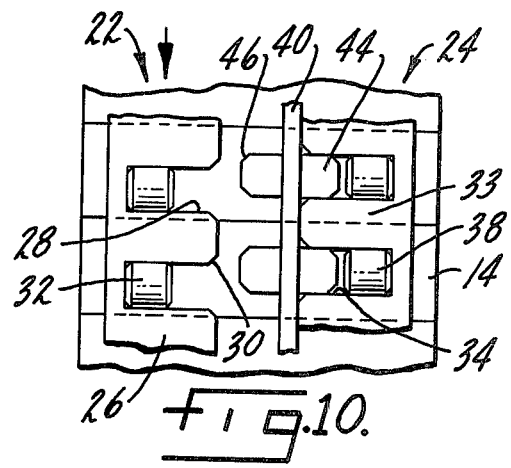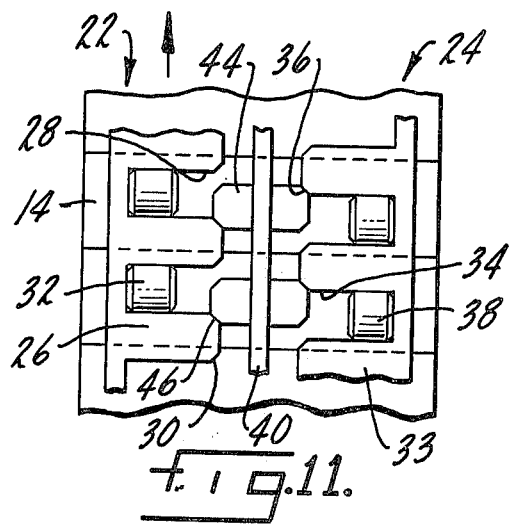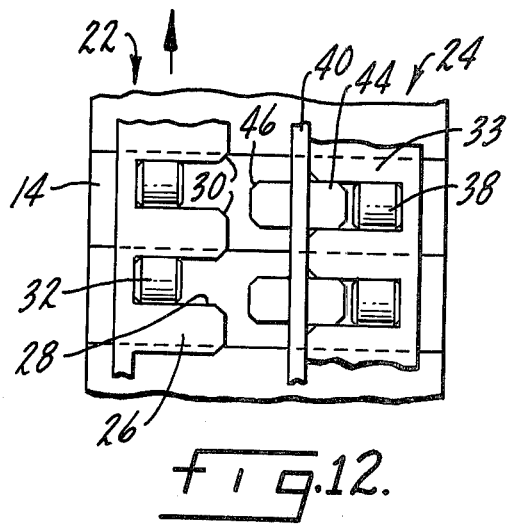

GEAR CHANGING MECHANISM

BACKGROUND OF THE INVENTION

1. Field of the Invention

This invention relates generally to gear changing mechanisms, and more particularly to a gear changing mechanism suitable for use with an automotive transmission incorporating an overdrive gearset or any two-speed gearset where it is acceptable to momentarily interrupt the power to change from one gear ratio to the other.

2. Description of the Prior Art

In recent years there have been many improvements in gear changing mechanisms, including improvements related to reversible overrunning clutches adapted for use in transferring torque through a power train in an automotive vehicle. Some of these gear changing mechanisms are adapted for unidirectional transmission of torque. Others, while capable of driving in two directions, generally require mechanical elements such as cams for shifting the direction of drive or for shifting from a drive position to a freewheel position.

Such gear changing mechanisms generally incorporate elaborate drive structure, including mechanical elements for effecting a change in position of sets of balls or rollers so as to shift drive ratios or shift between a drive ratio and a freewheel position within the mechanism itself. In addition, such mechanisms generally incorporate elaborate and complicated shift elements.

Accordingly, it is an object of this invention to meet the continuing need and desire in the art for improvements in gear changing mechanisms by providing an improved gear changing mechanism having means adapted to engage one of two inputs to drive an output. It may be used in an automotive transmission that now uses synchronizers to select various gear ratios, for example an overdrive consisting of a planetary gearset where the sun gear is locked to the planet carrier for direct drive and locked to the housing for overdrive.

SUMMARY OF THE INVENTION

This invention is directed in brief to an improved gear changing mechanism adapted for use in an automotive transmission incorporating a two-speed gearset, and particularly for use in transmissions incorporating an overdrive gearset where it is acceptable to momentarily interrupt the power to change from one gear ratio to another.

The mechanism includes a pair of bi-directional roller clutches sharing a common inner race, and a selecting member adapted to hold either of the clutches in a neutral freewheeling position. Besides the common inner race, each of the clutches includes a set of rollers guided by a retainer, and an outer race in the form of a cylindrical ring. The inner race is provided with a series of plane facets, each facet cooperating with a roller such that if the rollers are allowed to move they become wedged between the facets and the outer race, thereby transmitting torque. If the rollers are held in the center of the facets, clearance exists between them and the outer race an the clutch then freewheels. Movement of the shifting sleeve engages one clutch retainer, thereby holding that clutch in the freewheeling position. At the same time the other retainer is released, allowing the other clutch to be moved by the application of torque to engage and drive through its associated gearset.

BRIEF DESCRIPTION OF THE DRAWINGS

The objects and advantages of this invention will become apparent to those skilled in the art upon careful consideration of the specification herein, including the drawings, wherein:

FIG. 1 is an elevational view, partially in section, showing details of the two clutch assemblies and the shifting sleeve;

FIG. 2 is a partial elevational view of the shifting sleeve;

FIG. 3 is a cross-sectional view through a portion of the clutch assembly showing the relative position of the parts in the freewheeling mode of operation;

FIG. 4 is a cross-sectional view through a portion of the clutch assembly showing the relative position of the parts in the driving mode of operation;

FIG. 5 is a cross-sectional view through a portion of the clutch assembly showing the relative position of the parts in the coasting mode of operation;

FIG. 6 is a plan view, taken along the lines 6—6 of FIG. 1, showing the two retainer assemblies and their rollers sharing the common inner race, as well as the central position of the shifting sleeve;

FIG. 7 is a view similar to FIG. 6, showing the shifting sleeve engaging one of the clutches in its freewheeling mode while the other clutch is in the driving mode for transmitting torque;

FIG. 8 is a view similar to FIG. 7, showing the shifting sleeve in the process of being shifted out of the retainer of the freewheeling clutch, just prior to the momentary torque reversal;

FIG. 9 is a view similar to FIG. 8, showing the position of the clutches just as the momentary torque reversal is occurring;

FIG. 10 is a view similar to FIG. 9, showing the position of the clutches after the shifting operation has been completed. One clutch is in the driving mode transmitting torque and the other clutch is held by the shifting sleeve in the freewheeling mode;

FIG. 11 is a view similar to FIG. 9 except that the clutch being released is moving toward the coasting mode, and FIG. 12 is a view similar to FIG. 10, showing one clutch in its coasting mode transmitting torque and the other clutch held by the shifting sleeve in its freewheeling mode.

While this invention is susceptible of embodiment in many different forms, there is shown in the drawings and will herein be described in detail a preferred embodiment, with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, there is shown a gear changing mechanism 10 which is particularly useful in association with automotive transmissions where it is acceptable to momentarily interrupt the power to change from one gear ratio to another.

Gear changing mechanism 10 includes an inner race 12 which defines a plurality of plane facets 14 on the periphery thereof. Inner race 12 is adapted to drive a suitable output shaft 16. A pair of outer races 18 and 20 are spaced from inner race 12. Each output race is adapted to be driven by a suitable gearset.

A pair of bi-directional roller clutches 22 and 24 share common inner race 12. Clutch 22 is associated with outer race 18, and clutch 24 is similarly associated with outer race 20.

Clutch 22 includes a retainer 26 defining a plurality of grooves 28. Retainer 26 also defines a plurality of beveled surfaces 30 at the inner end of each of the grooves 28. A suitable roller 32 or the like is carried by retainer 26 in each of its grooves 28. Each roller 32 cooperates with a corresponding facet 14 of inner race 12.

Similarly, clutch 24 includes a retainer 33 defining a plurality of grooves 34 opening inwardly. Retainer 33 also defines a plurality of beveled surfaces 36 at the inner end of each of the grooves 34. A suitable roller 38 is retained in each groove 34 of retainer 33. Rollers 38 cooperate with corresponding facets 14 of inner race 12 in a manner similar to rollers 32 of clutch 22.

A selecting member 40 has a central opening with a plurality of plane surfaces 42. Surfaces 42 are cooperable with facets 14 of inner race 12 such that together they form a spline by which selecting member 40 is retained on inner race 12. Selecting member 40 is rotatable with and slidable along inner race 12.

Selecting member 40 defines a plurality of engaging elements 44 extending outwardly therefrom. Engaging elements 44 define beveled surfaces 46 in a manner similar to retainers 26 and 33 defining beveled surfaces 30 and 36, respectively. Each engaging element 44 is capable of being moved into a corresponding groove 28 of clutch 22 or groove 34 of clutch 24. Beveled surfaces 46 are tapered at the same angle as beveled surfaces 30 and 36 for cooperation therewith.

A suitable shifting fork 48 is slidably mounted on an actuator rod 50 and held axially by preloaded springs 52. Actuator rod 50 is connected through linkage or other suitable means to the operator's control and adapted so that whichever gear ratio is desired can be preselected by the operator, the actual movement of shifting fork 48 and selecting member 40 being accomplished rapidly and at the proper time by springs 52.

When rollers 32 and 38 of clutches 22 and 24, respectively, are oriented such that they are in the center of facets 14 of inner race 12, there is clearance between the rollers and the outer races. This condition obtains when engaging elements 44 of selecting member 40 are moved into either groove 28 or 34 to engage the associated retainer 26 or 33 in the central position. In this position the clutch so held is in its freewheeling mode, as shown in FIG. 3, while the other clutch is capable of transmitting torque in its driving mode as, shown in FIG. 4 or its coasting mode, as shown in FIG. 5. The clutch not engaged is free such that its retainer is allowed to move, and in response to the application of torque its rollers become wedged between inner race 12 and outer race 18 or 20, thereby transmitting torque.

Thus, it should be clear that the clutch engaged by the shifting sleeve is held in the freewheeling position while the clutch not so engaged is transmitting torque in either of its driving or coasting positions.

In FIG. 7, selecting member 40 has been moved from its intermediate position between clutches 22 and 24 to the left such that elements 44 enter grooves 28, thereby engaging retainer 26 and holding rollers 32 in a central position relative to facets 14. In this position clutch 22 is held in its freewheeling mode of operation. As shown, clutch 24 is transmitting torque in the driving mode of operation.

The changing of gear ratios is initiated by causing selecting member 40 to move to the right until it abutts retainer 33 of clutch 24. A suitable shifting means as shown in FIG. 1 is provided for moving selecting member 40. In this position, as shown in FIG. 8, clutch 22 is still engaged and held in its freewheeling position, and clutch 24 is still transmitting torque. To complete the shift, it is necessary to interrupt the power by a momentary torque reversal. This may be accomplished, for example, by an operator releasing the throttle in an automobile. At this point, rollers 38 are no longer wedged between inner race 12 and outer race 20, and clutch 24 approaches its freewheeling position. This condition is shown in FIG. 9, where selecting member 40, under the influence of the spring loading means, simultaneously begins engaging retainer 33 of clutch 24 to hold it in the freewheeling position, and disengaging retainer 26 of clutch 2 thereby allowing clutch 22 to begin moving from its freewheeling position. If the gear member associated with clutch 22 is initially turning slower than clutch 24, clutch 22 will move in the direction of the arrow. Beveled surfaces 46 of engaging elements 44 abutt beveled surfaces 30 of retainer 26 and beveled surfaces 36 of retainer 33. In this condition clutch 22 is still blocked from moving further in the direction of the arrow of FIG. 9.

As shown in FIG. 10, the spring loading mechanism has moved selecting member 40 to the right such that engaging members 44 enter grooves 34 of retainer 32, thereby holding clutch 24 in its freewheeling position. Clutch 22 has been disengaged, thereby fully releasing it and allowing it to move in the direction of the arrow of FIG. 10 into its driving mode of operation.

If the gear member associated with clutch 22 is initially turning faster than clutch 24, clutch 22 would tend toward its coasting position rather than its driving position. This condition is shown in FIG. 11 where it will be seen that the opposite beveled surfaces 46 of engaging members 44 and beveled surfaces 30 of retainer 26 abutt, thereby holding clutch 22 in its freewheeling position although it tends toward its coasting position shown by the arrow. FIG. 12 shows the completion of the shift, with selecting member 40 holding clutch 24 in its freewheeling position and fully releasing clutch 22, allowing it to move to its coasting position under the influence of the torque.

Obviously, shifting gears in the opposite direction is accomplished by a similar operation, and again may be to either of the driving or coasting modes of operation, as determined by the operator.

Thus, it will be seen that the invention comprises a compact and simple gear changing mechanism which allows for the initiation of the gear changing operation by controlled means and the completion of the operation automatically upon a momentary torque reversal.

Although a preferred embodiment of the gear changing mechanism has been disclosed herein, as applied, for example, to an automotive vehicle, it should be understood that it may be used in other settings. While a preferred embodiment of the invention has been shown and described, it should be considered as illustrative and may be modified by those skilled in the art without departing from the scope thereof, which is to be limited only by the claims herein.

I claim:

1. In a torque transfer mechanism, the combination comprising input means including first and second outer races, output means including an inner race, first and second bi-directional clutches between said first and second outer races, respectively, and said inner race, and shifting means engagable with said first clutch for positioning said first clutch in a freewheeling mode and rendering said second clutch positionable in a torque transferring mode in response to the application of torque to the mechanism, said shifting means being disengagable with said first clutch and engagable with said second clutch upon a momentary torque interruption for positioning said second clutch in a freewheeling mode and rendering said first clutch positionable in a torque transferring mode in response to torque applied to the mechanism.

2. The invention according to claim 1, said inner race defining a plurality of plane facets, and each of said clutches including a retainer supporting a plurality of roller elements, each retainer being rotatable relative to said races between said freewheeling mode in which each roller element is loosely supported between a facet and an outer race, a driving mode in which each roller element is wedged between a facet and an outer race for torque transfer in one direction, and a coasting mode in which each roller element is wedged between a facet and an outer race for torque transfer in the opposite direction.

3. The invention according to claim 2, said shifting means being slidable relative to said races between first and second positions selectively engaging said first and second retainers for said engaging and disengaging of said first and second clutches, respectively.

4. The invention according to claim 3, resilient means associated with said shifting means for completing selective engagement of said shifting means with said retainers upon a momentary torque interruption.

5. A torque transfer mechanism comprising an inner race adapted for connection in a power train, a pair of outer races each adapted for connection in the power train, said outer races being spaced from each other and from said inner race, a pair of retainers each supporting a plurality of roller elements between said inner race and an outer race, said retainers defining a plurality of inwardly facing grooves, said retainers being movable relative to said races between a freewheeling position in which said roller elements are loosely supported between said inner and outer races, a driving position in which said roller elements are wedged between said inner and outer races for torque transfer in one direction, and a coasting position in which said roller elements are wedged between said inner and outer races for torque transfer in another direction, and shifting means between said retainers and movable selectively into said grooves for engaging one of said retainers in said freewheeling position and freeing the other of said retainers for movement to a torque transferring position in response to the transfer of torque through the power train.

6. The invention according to claim 5, said retainers being rotatable relative to said inner race between said positions, and said shifting means being slidable relative to said inner race between said grooves.

7. The invention according to claim 5, said shifting means being movable from said one retainer engaging position to an intermediate position, and being movable from said intermediate position to the other retainer engaging position in response to a momentary torque reversal.

8. The invention according to claim 7, resilient means associated with said shifting means for moving said shifting means from said intermediate position to an engaging position upon said momentary torque reversal.

9. The invention according to claim 7, said shifting means being movable manually from said one retainer engaging position to said intermediate position.

10. The invention according to claim 7, said shifting means being in engagement with said one retainer when in said intermediate position.

\* \* \* \* \*

UNITED STATES PATENT OFFICE
CERTIFICATE OF CORRECTION

Patent No. 3,949,848              Dated April 13, 1976

Inventor(s) Mark J. Fogelberg

It is certified that error appears in the above-identified patent and that said Letters Patent are hereby corrected as shown below:

On the cover sheet in item "[75]" the inventor's name "Mark J. Fogelber" should read -- Mark J. Fogelberg --.

Signed and Sealed this

Twentieth Day of July 1976

[SEAL]

Attest:

RUTH C. MASON
Attesting Officer

C. MARSHALL DANN
Commissioner of Patents and Trademarks